US012067734B2

(12) United States Patent
Shimizu

(10) Patent No.: US 12,067,734 B2
(45) Date of Patent: Aug. 20, 2024

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Tomoyuki Shimizu, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 189 days.

(21) Appl. No.: 17/343,029

(22) Filed: Jun. 9, 2021

(65) Prior Publication Data

US 2021/0390712 A1 Dec. 16, 2021

(30) Foreign Application Priority Data

Jun. 16, 2020 (JP) .................................. 2020-103650

(51) Int. Cl.
  *G06T 7/246* (2017.01)
  *G06T 7/62* (2017.01)
  *G06V 20/40* (2022.01)

(52) U.S. Cl.
  CPC .............. *G06T 7/248* (2017.01); *G06T 7/62* (2017.01); *G06V 20/40* (2022.01); *G06T 2207/10016* (2013.01)

(58) Field of Classification Search
  None
  See application file for complete search history.

(56) References Cited

U.S. PATENT DOCUMENTS

| 2008/0094470 A1* | 4/2008 | Wong ....................... H04N 7/18 348/143 |
| 2008/0152223 A1* | 6/2008 | Maeda ...................... G06T 5/40 382/168 |
| 2008/0180525 A1* | 7/2008 | Kanehira ................ G06V 20/52 348/E7.086 |

FOREIGN PATENT DOCUMENTS

| JP | 2012181710 A | | 9/2012 | |
| JP | 2015114933 | * | 6/2015 | |
| WO | WO-2018179119 A1 | * | 10/2018 | ......... G06K 9/00261 |

* cited by examiner

*Primary Examiner* — Vikkram Bali
(74) *Attorney, Agent, or Firm* — CANON U.S.A., INC. IP Division

(57) ABSTRACT

An apparatus is configured to perform a tracking process using a first frame image and a second frame image separated from the first frame image by a predetermined period of time in a video image, and includes a detection unit configured to detect a subject as a tracking target from each of the first frame image and the second frame image, a first determination unit configured to determine whether the tracking targets are in a moving state or in a non-moving state in each combination of the tracking target detected from the first frame image and the tracking target detected from the second frame image, and a second determination unit configured to perform matching determination to determine whether the combination is a combination of identical tracking targets if the combination of the tracking targets is a combination of tracking targets in the non-moving state.

16 Claims, 10 Drawing Sheets

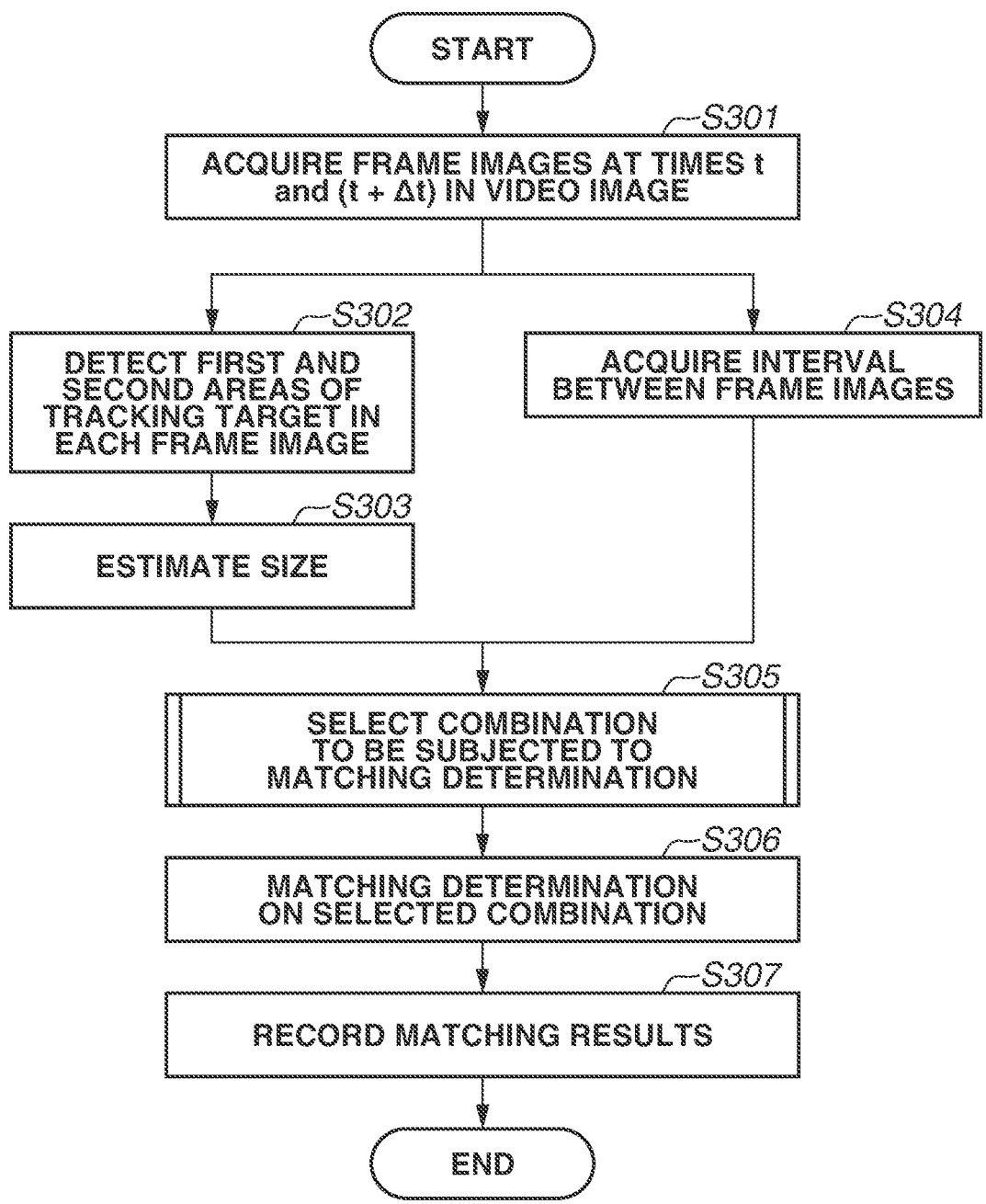

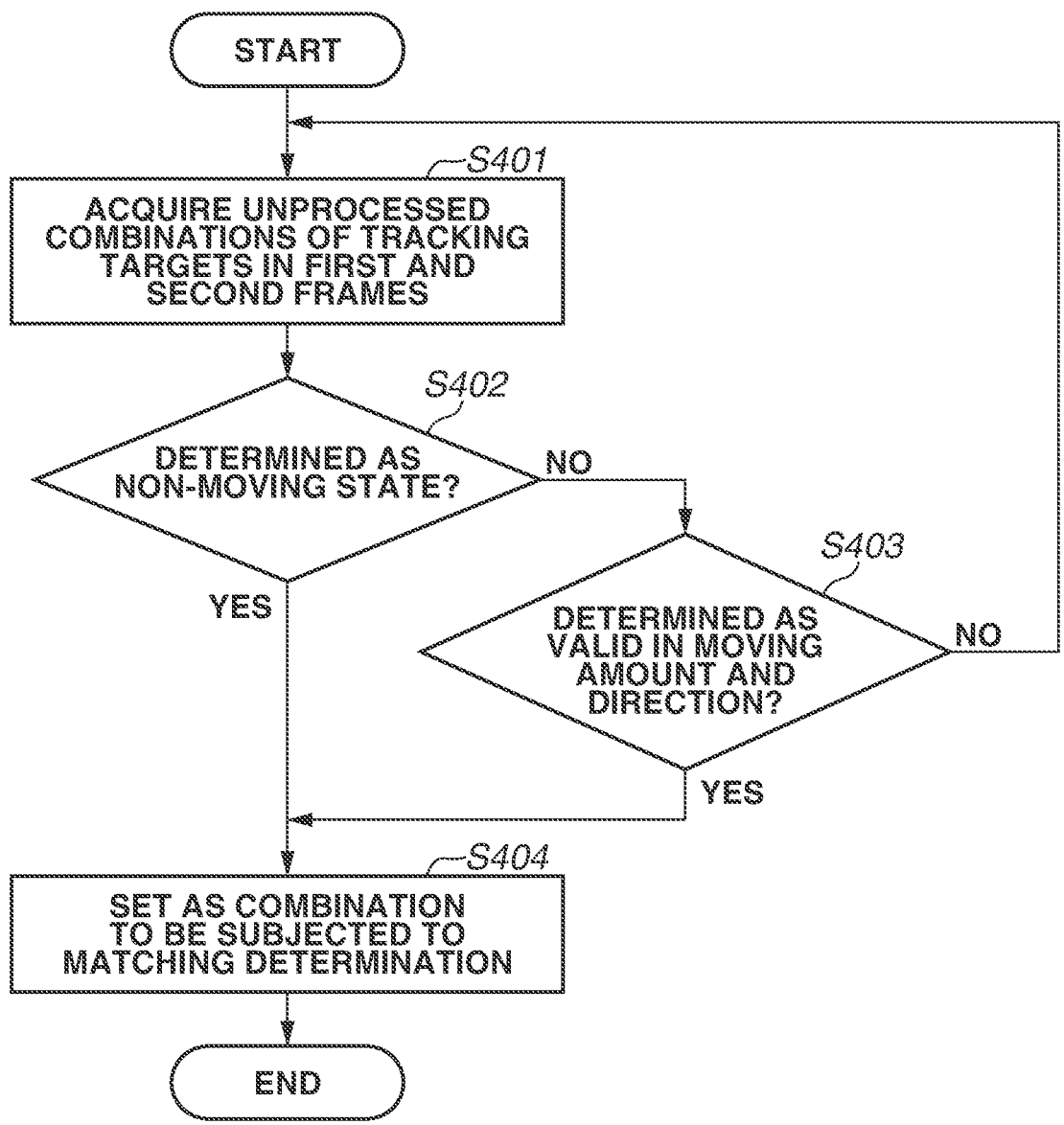

IMAGE PROCESSING APPARATUS, IMAGE PROCESSING METHOD, AND STORAGE MEDIUM

BACKGROUND OF THE DISCLOSURE

Field of the Disclosure

The aspect of the embodiments relates to an image processing apparatus, an image processing method, and a storage medium.

Description of the Related Art

There is a technique for obtaining a moving amount and a moving direction of a target from a position in a past frame, predicting a moving destination in a next frame and narrowing down a target area in a tracking process for tracking a person or the like in a video image (for example, refer to Japanese Patent Application Laid-Open No. 2012-181710). In recent years, a frame rate at which a moving image is captured by a general camera has been 30 frames/second (fps) or 60 fps in many cases, which makes few great changes in the moving amount and moving direction in a short time. Thus, further accuracy improvement by a tracking process based on prediction can be expected.

In a video image captured at a high frame rate as described above, tracking a large number of subjects in frames may cause an issue of lower throughput due to increase of the processing cost. This also may cause other issues such as a larger amount of data transfer for acquiring the video image through a network and processing the video image, and the need for increasing the storage capacity for recording the data. For this reason, there is high demand for a method for tracking a subject in a video image captured at a low frame rate with relatively large frame intervals. On the other hand, if the frame intervals are made longer, a subject in the video image is highly likely to show a motion different from that in the previous frame. For example, if the subject in a video image is a person walking at a constant speed, the movement prediction of the subject is useful even if the frame rate is low. Similarly, movement prediction is useful for tracking a person in a nearly stationary state such as sitting in a video image captured at a high frame rate because he/she appears to be almost motionless. However, if the frame intervals are large, the subject appears to be constantly on the move at random, and accordingly, it is difficult to predict the movement of the subject. For this reason, if a tracking process is performed using movement prediction based on the results of the past tracking, the tracking of the target may fail in a video image captured at a low frame rate.

SUMMARY OF THE DISCLOSURE

According to an aspect of the embodiments, an apparatus is configured to perform a tracking process using a first frame image and a second frame image separated from the first frame image by a predetermined period of time in a video image, and the image processing apparatus includes a detection unit configured to detect a subject as a tracking target from each of the first frame image and the second frame image, a first determination unit configured to determine whether the tracking targets are in a moving state or in a non-moving state in each combination of the tracking target detected from the first frame image and the tracking target detected from the second frame image, and a second determination unit configured to perform matching determination to determine whether the combination is a combination of identical tracking targets in a case where the combination of the tracking targets is a combination of tracking targets in the non-moving state.

Further features of the disclosure will become apparent from the following description of exemplary embodiments with reference to the attached drawings.

BRIEF DESCRIPTION OF THE DRAWINGS

FIG. 3 is a flowchart illustrating a processing example of the image processing apparatus according to the exemplary embodiments of the disclosure.

FIG. 4 is a flowchart illustrating an example of a selection process of a combination to be subjected to a matching process according to the exemplary embodiments of the disclosure.

DESCRIPTION OF THE EMBODIMENTS

Exemplary embodiments of the disclosure will be described with reference to the drawings.

Figure 1:
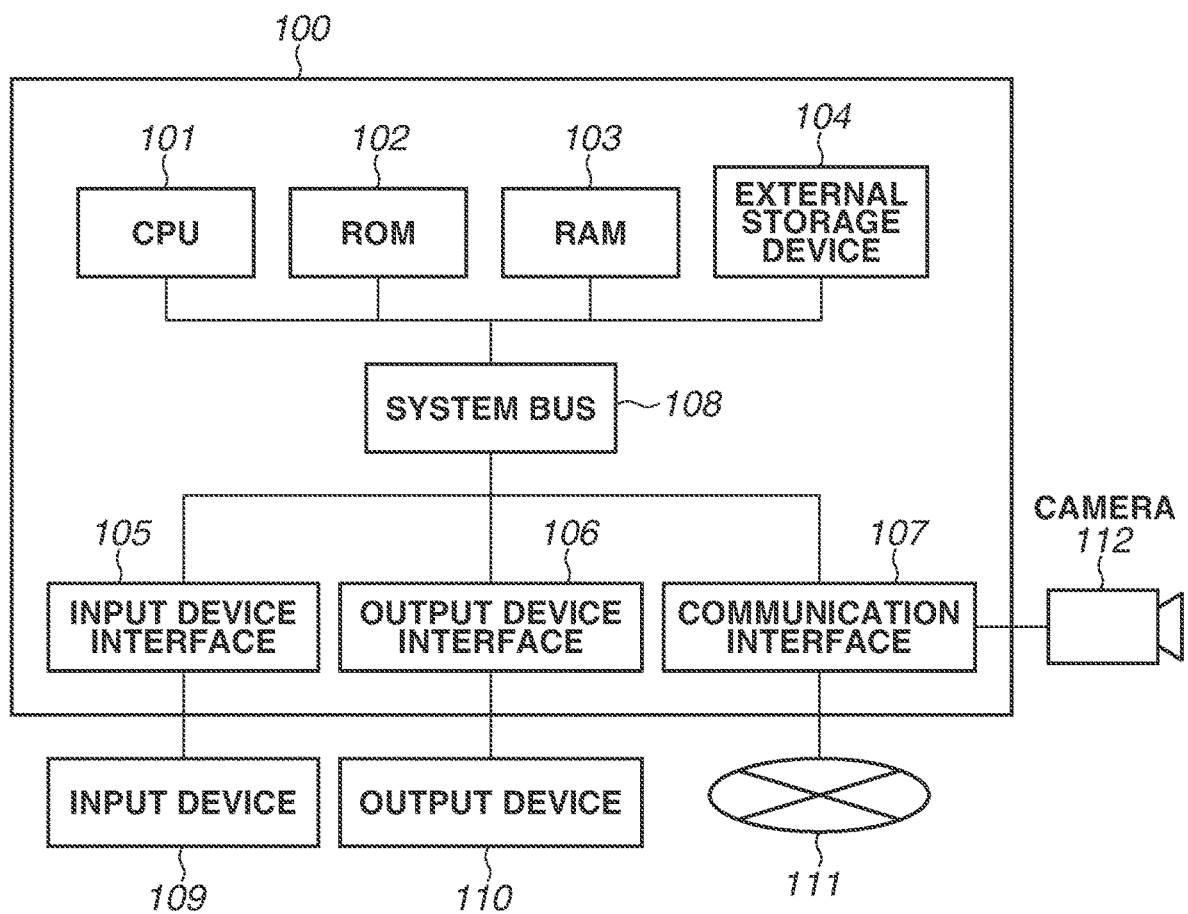
FIG. 1 is a diagram illustrating a hardware configuration example of an image processing apparatus according to exemplary embodiments of the disclosure.

A first exemplary embodiment of the disclosure will be described. FIG. 1 is a block diagram illustrating a hardware configuration example of a computer apparatus that implements an image processing apparatus according to the first exemplary embodiment. The image processing apparatus may be implemented by a single computer apparatus or may be implemented by a plurality of computer apparatuses having distributed functions as necessary. In the case where the image processing apparatus is formed of a plurality of computer apparatuses, the computer apparatuses are connected so as to be communicable with one another via a communication network such as a local area network (LAN).

A computer apparatus 100 has a central processing unit (CPU) 101, a read only memory (ROM) 102, a random access memory (RAM) 103, an external storage device 104, an input device interface 105, an output device interface 106, and a communication interface 107. The CPU 101, the ROM 102, the RAM 103, the external storage device 104, the input device interface 105, the output device interface 106, and the communication interface 107 are communicably connected with each other via a system bus 108.

The CPU 101 controls the entire computer apparatus 100. The ROM 102 is a memory that stores programs and parameters that need not be changed. The RAM 103 is a memory that temporarily stores programs and data supplied from an external device or the like.

The external storage device 104 is a storage device that stores video images and the like acquired from an external device. Examples of the external storage device 104 include a hard disk fixedly installed in the computer apparatus 100 and a memory card. Specific examples of the external storage device 104 include optical disks such as a flexible disk (FD) and a compact disk (CD), magnetic and optical cards, an IC card, and a memory card, which are attachable to and detachable from the computer apparatus 100.

The input device interface 105 is an interface with an input device 109 such as a pointing device or a keyboard that inputs data in accordance with a user operation. The output device interface 106 is an interface with an output device 110 such as a monitor that outputs execution results of data held by the computer apparatus 100 or supplied data and programs. The communication interface 107 is an interface for connection with a network line 111 such as the internet, and a camera 112. The camera 112 may be connected to the computer apparatus 100 through the network line 111.

Figure 2:
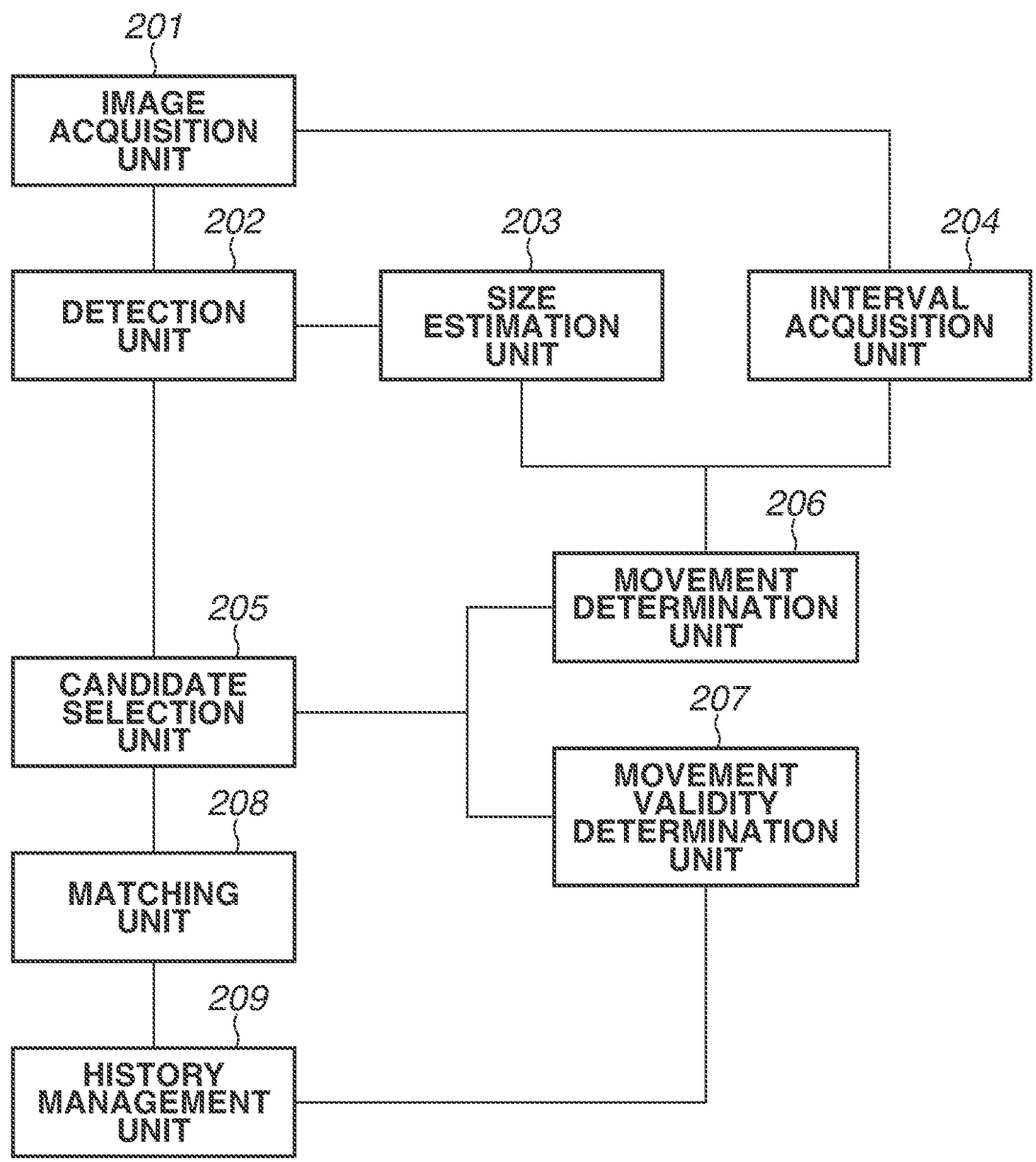
FIG. 2 is a diagram illustrating a functional configuration example of the image processing apparatus according to the exemplary embodiments of the disclosure.

FIG. 2 is a block diagram illustrating a functional configuration example of the image processing apparatus according to the present exemplary embodiment. The image processing apparatus according to the present exemplary embodiment has an image acquisition unit 201, a detection unit 202, a size estimation unit 203, an interval acquisition unit 204, a candidate selection unit 205, a movement determination unit 206, a movement validity determination unit 207, a matching unit 208, and a history management unit 209.

The image acquisition unit 201 acquires an image as an input from the camera 112. In the present exemplary embodiment, the camera 112 captures a moving image and the image acquisition unit 201 acquires two frame images separated from each other by a certain time in the video image captured by the camera 112. In other words, the image acquisition unit 201 acquires an image at time t (first frame image) and an image at time (t+Δt) (second frame image) separated from the time t by a predetermined period of time Δt. Each of the frame images has at least capturing date and time information (time stamp) as metadata, and the interval acquisition unit 204 described below can calculate the time width (Δt) between the two frame images. However, the disclosure is not limited to this example, but the frame rate may be acquired instead because the frame rate can be acquired as metadata of a video file including camera settings and two frames in many cases.

The detection unit 202 processes the first frame image and the second frame image acquired by the image acquisition unit 201 to detect a subject as a tracking target from each of the frame images and identify a detection position on the image. In this case, the detection unit 202 also detects information that can be used for estimating a size of the subject as the tracking target by the size estimation unit 203. The detection unit 202 may detect, for example, two areas from the tracking target. If two points can be obtained from the tracking target, a line segment connecting the two points can be used as information correlated to the size of the subject as the tracking target.

Figure 5A:
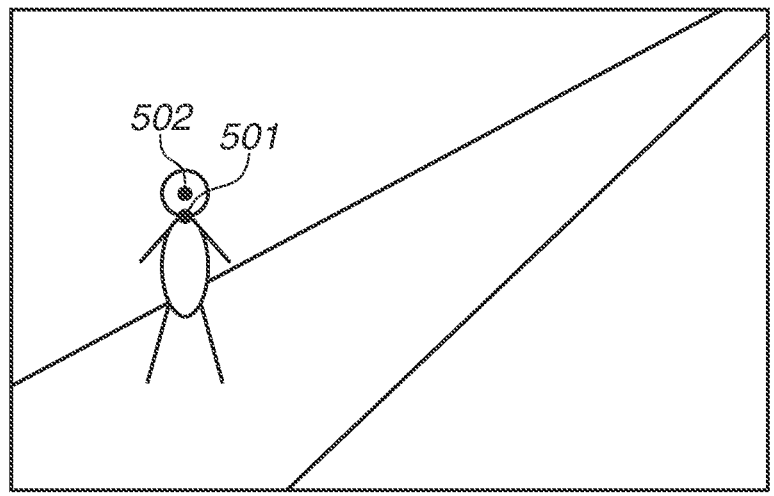
FIGS. 5A and 5B are diagrams describing an example of detecting two areas from a tracking target.
Figure 5B:
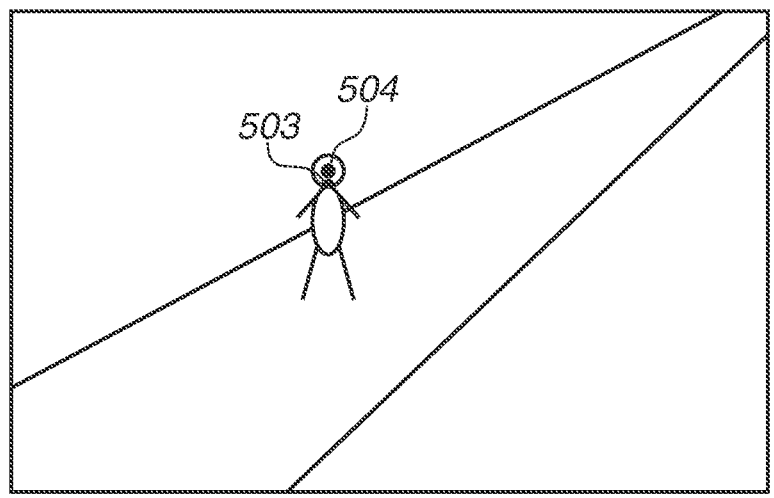

In the present embodiment, the tracking target is a person as an example and the detection unit 202 detects two areas included in the person. For example, as illustrated in FIG. 5A, the detection unit 202 may detect a neck position (501) and a head center position (502) of the person in the image. Assuming that FIG. 5A illustrates the first frame image, the detection unit 202 performs similar detection from the second frame image (FIG. 5B) separated from the first frame image by the predetermined period of time Δt to detect a neck position (503) and a head center position (504) of the person in the image. In the example of FIGS. 5A and 5B, one person is seen in the images. However, if there is a plurality of persons, similar detection is performed on all the persons.

The information detected by the detection unit 202 and usable for size estimation of the subject as the tracking target is not limited to this example. For example, the detection unit 202 may detect a rectangular area that circumscribes the head. The size of the head can be said to be highly correlated to the size of the person's body. If the tracking target is a person, the detection unit 202 may also detect such information correlated to the size of the person.

Based on the information detected by the detection unit 202, the size estimation unit 203 estimates the size of the subject as the tracking target. In the present embodiment, as described above, the detection unit 202 acquires the distance (the number of pixels) between the coordinate positions of the two areas in the neck and the head center of the person as the tracking target, and the size estimation unit 203 roughly calculates the size (the number of pixels) of the person. For example, in a case of estimating the size of the person from the neck position and the head center position of the person, the size of the person may be estimated by multiplying the dimension between the two points by a constant such as dozen folds or so, considering that the dimension between the two points is equivalent to about half the head size and a typical adult is six or seven heads tall.

Although the method for estimating the size of the subject varies depending on a tracking target and a combination of areas to be detected, the multiplying factor for size estimation may be decided in advance as described above. Otherwise, if the subject is a person, the body proportion is different between child and adult, and thus the multiplying factor may be changed in accordance with usage scenes. The size of the subject as the tracking target may be obtained from at least one of the first frame image and the second frame image. However, since the size estimation may not be correctly made due to an error in the detection process, either one of the images from which the correct detection result is obtained may be used for size estimation. Alternatively, the frames to be used for size estimation may be changed in accordance with the confidence score of the detection result.

The interval acquisition unit 204 acquires a time interval between the first frame image and the second frame image acquired by the image acquisition unit 201. In the present exemplary embodiment, since the time stamps of the acquired frames are acquirable, the interval acquisition unit 204 acquires the time width between the two frame images by comparing the acquired time stamps.

The candidate selection unit 205 selects a combination of subjects as the tracking targets detected from the first frame image and the second frame image that are to be subjected to determination on whether the subjects are identical (matching determination). The candidate selection unit 205 selects a combination of subjects as the tracking targets to be subjected to matching determination, in accordance with the results of determination by the movement determination unit 206 and the movement validity determination unit 207.

Figure 6A:
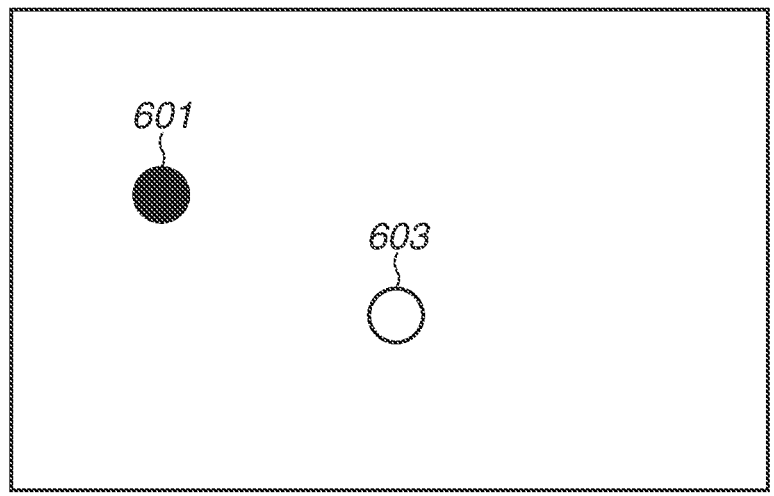
FIGS. 6A and 6B are diagrams describing a detection example of areas from two frame images.
Figure 6B:
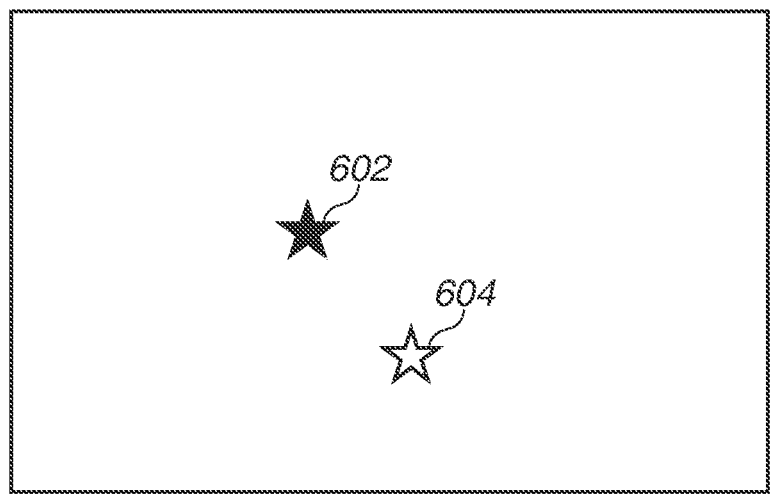

The candidates for a combination to be subjected to matching determination will be described with reference to FIGS. 6A and 6B. FIG. 6A illustrates a first frame image and FIG. 6B illustrates a second frame image. As illustrated in FIG. 6A, two detection areas 601 and 603 are detected as targets from the first frame image, and as illustrated in FIG.

6B, two detection areas 602 and 604 are detected as targets from the second frame image. In this case, there are four possible combinations of detection areas that move between the frames, (601 to 602), (601 to 604), (603 to 602), and (603 to 604) (hereinafter, called movement candidates). The candidate selection unit 205 selects combinations to be subjected to matching determination for identicalness of the targets by the matching unit 208, from among the movement candidates of detection positions in the frames, in accordance with the results of determination by the movement determination unit 206 and the movement validity determination unit 207. The detailed flow of the process performed by the candidate selection unit 205 will be described below with reference to the flowchart of FIG. 4.

The movement determination unit 206 determines whether the combination of movement candidates of interest is in a moving state, in accordance with the results of estimation by the size estimation unit 203 and the time interval between the first frame image and the second frame image acquired by the interval acquisition unit 204. In the present exemplary embodiment, a minimum moving amount threshold value th for distinguishing between the moving state and the non-moving state is determined by the following equation, from the time interval Δt between the frames and a size s (pixels) of the subject as the tracking target:

$$th = \alpha(\Delta t \times s)$$

In the equation, α denotes a coefficient to be determined by the subject and the contents of the video image. In a case of a video image of a walking person, for example, the coefficient α may be heuristically determined in advance from the video image. Alternatively, correct-answer information on movement and non-movement may be set to a video image close to the usage status to statistically calculate the coefficient α by linear regression or the like.

Figure 7:
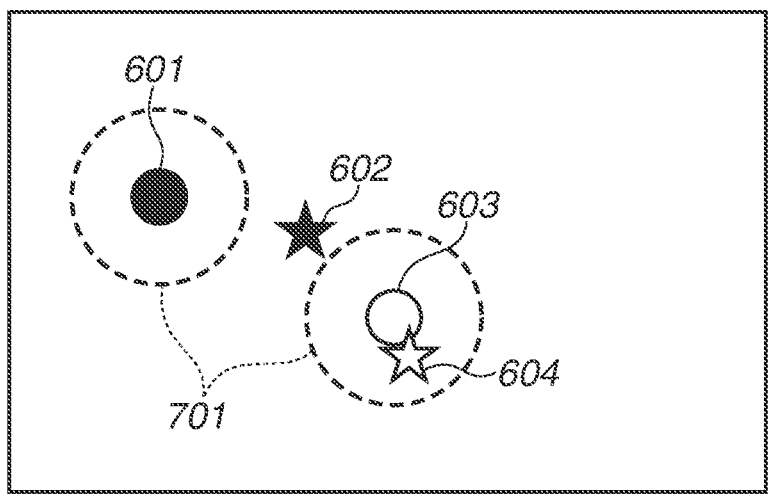
FIG. 7 is a diagram describing an example of a minimum moving amount threshold value and combinations of tracking targets in two frame images.

If the distance (pixels) between the detection positions in the combination of movement candidates of interest exceeds the minimum moving amount threshold value th, the movement determination unit 206 determines that the combination is in the moving state, and if the distance does not exceed the minimum moving amount threshold value th, the movement determination unit 206 determines that the combination is in the non-moving state. The moving state and the non-moving state will be described with reference to FIG. 7. FIG. 7 is a diagram illustrating overlapping display of the detection areas detected from the two frame images illustrated in FIGS. 6A and 6B. In FIG. 7, regions 701 indicate the ranges of the minimum moving amount threshold value th determined by the method described above, which are the range of the minimum moving amount threshold value th from the detection area 601 and the range of the minimum moving amount threshold value th from the detection area 603 in the first frame image. In the example illustrated in FIG. 7, since the combinations (601, 602), (601, 604), and (603, 602) exceed the minimum moving amount threshold value th, the movement determination unit 206 determines that these combinations are in the moving state. On the other hand, since the combination (603, 604) falls within the range of the minimum moving amount threshold value th, the movement determination unit 206 determines that the combination is in the non-moving state.

If it is assumed that the combination of movement candidates of interest is correct, the movement validity determination unit 207 determines whether the moving amount and moving direction of the combination are valid with reference to the past moving amount and moving direction. The movement validity determination unit 207 acquires, from the history management unit 209, information on the past moving amount and moving direction in the detection area of the first frame image in the combination of movement candidates of interest, and predicts the range of a movement position in the second frame image. The candidate selection unit 205 determines whether the combination is taken as a candidate to be subjected to matching determination, depending on whether the detection area in the second frame image in the combination of movement candidates of interest falls within the predicted range of the movement position. In the example illustrated in FIG. 7, there are the detection areas 601 and 603 as the tracking targets in the first frame image, and the movement validity determination unit 207 acquires, from the history management unit 209, information on the past moving amounts and moving directions of these tracking targets, and determines the validity of the movement of these tracking targets.

In the present exemplary embodiment, the moving amounts (pixels) in x and y directions from the past tracking are recorded on the history management unit 209 as a movement history together with the position coordinates of the tracking target. Among the combinations of movement candidates of interest, the movement validity determination unit 207 acquires, from the history management unit 209, the moving amount in relation to the coordinates of the tracking target in the first frame image, and adds the acquired moving amount to the coordinates of the tracking target to calculate the predicted position. The movement validity determination unit 207 determines whether the detection position in the second frame image falls within a certain size of region determined in advance from the calculated predicted position.

The disclosure, however, is not limited to this example but it is simply necessary to select a combination to be subjected to matching determination by the matching unit 208. For example, in order to exclude a combination of tracking targets that show a sudden movement in the opposite direction between two frames, a process as described below may be performed. The past moving amount and moving direction (Δx, Δy) are set as first vector, and the movement vector from the tracking target in the first frame image to the tracking target in the second frame image in the combination of interest is set as second vector. The inner product of the first vector and the second vector may be determined and used for determination on the validity of movement indicating that the movement is not negative, that is, not movement in the opposite direction.

The matching unit 208 determines whether each of the combinations selected by the candidate selection unit 205 is a combination of identical targets. For each of the tracking targets in the first frame image, the matching unit 208 determines the degree of similarity between feature amounts of the combination selected from the tracking target in the second frame image, and decides the combinations of identical tracking targets, taking the combination with the highest score of similarity on a priority basis.

The history management unit 209 stores and manages the moving amount and moving direction of each tracking target decided by the matching unit 208 as a movement history so that the moving amount and moving direction are acquirable for the next two-frame processing. In the present exemplary embodiment, since the moving amount and moving direction of a tracking target from the first frame image to the second frame image can be known from the results of determination by the matching unit 208, this information on the moving amount and moving direction is stored and managed in association with the position of the tracking target in the second frame image. In the present exemplary embodiment, since the image acquisition unit 201 repeats the tracking process while acquiring frame images in succession, the current second frame image will be processed as a first frame image in the next tracking process. Storing and managing the information including the movement history in the history management unit 209 as described above enables the movement validity determination unit 207 to use the information on the past moving amount and moving direction of each tracking target in the first frame image.

The procedure for the process performed by the image processing apparatus in the present exemplary embodiment will be described with reference to the flowchart illustrated in FIG. 3. FIG. 3 is the flowchart illustrating an example of the process performed by the image processing apparatus in the present exemplary embodiment. In the present exemplary embodiment, such a case is to be described that frame images are input in succession at time intervals Δt from a video image captured by one camera and that identical areas of identical objects detected in two frame images are tracked in association with each other between the images. For example, such a case is assumed that the camera 112 is a monitoring camera installed at a position where the camera 112 is to monitor and track the movements of persons and the camera 112 tracks movements of each of the persons between two frame images in the video image.

In step S301, the image acquisition unit 201 acquires, from the video image captured by the camera 112, a frame image at time t (first frame image) and a frame image at time (t+Δt) (second frame image) separated from time t by a predetermined period of time Δt. In the present exemplary embodiment, both the first frame image and the second frame image are acquired because subjects as tracking targets are detected in advance in the two frame images and then determine the identicalness of the detected targets by the matching unit 208.

In step S302, the detection unit 202 detects two areas in a person as the tracking target from each of the first frame image and the second frame image. In the present exemplary embodiment, as described above, the detection unit 202 detects the neck (first area) and head center (second area) of the person. The detection unit 202 performs this detection on all the tracking targets in each of the first frame image and the second frame image, and identifies and outputs the information on the coordinate positions of the detected areas.

In step S303, the size estimation unit 203 estimates the size of each subject (person) as a tracking target detected by the detection unit 202 in step S302. In the present exemplary embodiment, as described above, two areas of neck and head center of each person as a tracking target are detected, and the size of each person is estimated based on the number of pixels between the two areas.

In step S304, the interval acquisition unit 204 acquires the time interval between the first frame image and the second frame image acquired in step S301. The processing in step S304 is not dependent on the processing in steps S302 and S303, and thus, after the image acquisition unit 201 acquires the frame images in step S301, these frame images may be processed in no synchronization with the processing in steps S302 and S303.

In step S305, the candidate selection unit 205 selects the combinations to be subjected to matching determination by the matching unit 208 from among the tracking targets in the first frame image and the second frame image. The flow of a process of selecting the movement candidates by the candidate selection unit 205 will be described below. By the processing in step S305, the combinations of candidates to be subjected to matching determination by the matching unit 208 are output.

In step S306, the matching unit 208 determines whether each of the combinations to be subjected to matching determination output in step S305 is a combination of identical targets. This results in tracking information indicating the tracking target in the second frame image to which the subject as the tracking target in the first frame image has moved.

In step S307, the history management unit 209 stores the tracking information obtained by the matching determination in step S306 in association with the tracking target in the second frame image.

The flow of a process performed by the candidate selection unit 205 will be described with reference to the flowchart illustrated in FIG. 4. FIG. 4 is the flowchart illustrating an example of a selection process of a combination to be subjected to a matching determination process. In this example, the processing in steps S302 to S304 illustrated in FIG. 3 has been finished, and the persons as tracking targets have been detected from the first frame image and the second frame image, and the sizes of the persons and the time intervals between the frame images have been acquired.

In step S401, the candidate selection unit 205 selects an unprocessed combination from among the combinations of movement candidates of the tracking targets in the first frame image and the tracking targets in the second frame image. In the present exemplary embodiment, this process is performed on all the combinations of the tracking targets in the first frame image and the second frame images. At this point of time, the tracking targets in the first frame image and the second frame image have been already detected.

In step S402, the movement determination unit 206 determines whether each of the combinations of movement candidates acquired in step S401 is in the moving state or the non-moving state. If the movement determination unit 206 determines that the combination of movement candidates is in the non-moving state (YES in step S402), the processing proceeds to step S404. In step S404, the movement determination unit 206 sets the combination of movement candidates as a candidate for combination to be subjected to matching determination by the matching unit 208. This suppresses the tracking of the combination of movement candidates from being wrongly ceased due to determination based on the moving amount and moving direction. On the other hand, if the movement determination unit 206 determines that the combination of moving targets is in the moving state (NO in step S402), the processing proceeds to step S403.

As described above in relation to the present exemplary embodiment, according to the method to detect tracking targets in advance from two frame images and match the combinations of these tracking targets, it is possible to find the tracking targets even at a long frame interval, thereby achieving tracking at a low frame rate. In the present exemplary embodiment, among the combinations of movement candidates of tracking targets detected from two frame images, the combinations to be subjected to matching determination are changed depending on the moving states of the combinations. If a combination of movement candidates is determined to be in the non-moving state, the combination of movement candidate is subjected to matching determination regardless of the moving amount and moving direction.

Accordingly, the combination in the non-moving state will not be excluded from the matching determination targets, which suppresses the tracking of the combination from being wrongly ceased. Therefore, even if a video image is captured at a low frame rate, the tracking target can be accurately tracked, so that it is possible to save the capacity for recording frame images and reduce the transfer amount of frame images to cloud storage or the like without degrading the tracking accuracy.

A secondary exemplary embodiment of the disclosure will be described.

Figure 8:
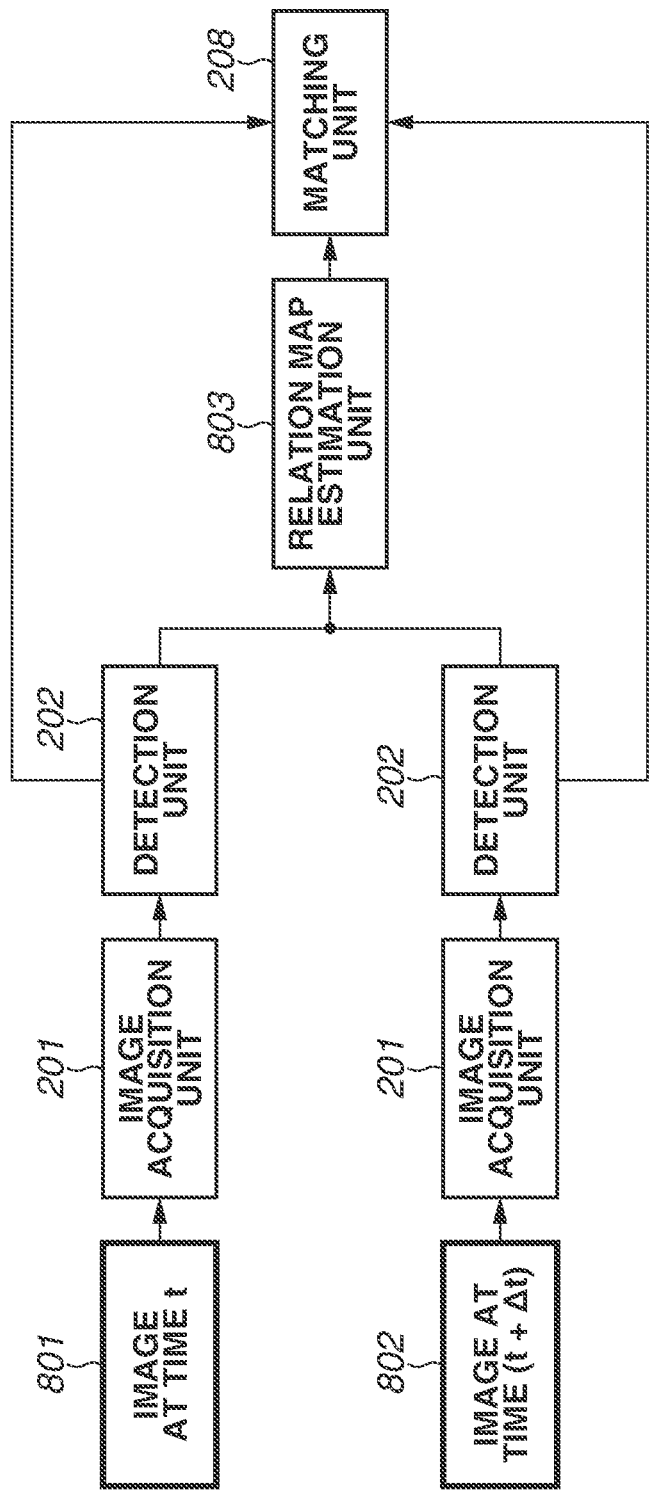
FIG. 8 is a diagram describing an image processing apparatus according to a second exemplary embodiment.

In the second exemplary embodiment, a tracking process is performed with a configuration, for example, as illustrated in FIG. 8. Although an image acquisition unit 201, a detection unit 202, and a matching unit 208 illustrated in FIG. 8 are similar to the image acquisition unit 201, the detection unit 202, and the matching unit 208 illustrated in FIG. 2, specific processes performed by these units in the present exemplary embodiment will be described below.

In the second exemplary embodiment, the image acquisition unit 201 acquires an image 801 at time t (first frame image) and an image 802 at time (t+Δt) (second frame image) separated from time t by a predetermined period of time Δt.

The detection unit 202 performs a detection process on these images to acquire position information about subjects (areas) as tracking targets. For matching of identical targets between the frames, a relation map estimation unit 803 acquires feature information about the tracking targets from the detection unit 202, and estimates, from the feature information, relation information between the tracking targets in the first frame image and the second frame image.

In the present exemplary embodiment, the detection unit 202 uses a convolutional neural network (CNN) that is configured to output the position of a specific part of a specific object in an image. The detection unit 202 learns in advance this neural network by a task of detecting specific positions in a specific object as a detection target. For example, if the detection target is a person, the detection unit 202 learns the neural network to output a map where, with regard to the center positions (hereinafter, called joint points) of the person's neck, head, and waist, the positions with joint points take on likelihood values close to 1 and the other positions take on likelihood values close to 0. In this case of learning, the map can be estimated by a one-time neural network process on the input of a frame image to detect the tracking target from the entire frame image, which results in an increased level of detection throughput. If the frame image as illustrated in FIG. 5A is input, for example, a point value close to 1 for the neck position 501 and point values close to 0 for the other positions are output to the detection map of the neck position. If a plurality of persons is seen in an image, the respective detection positions of the persons' necks take on 1 and the other positions take on 0 in the map.

The output (intermediate features) from an intermediate layer of the neural network in the detection process is used as the feature information about the tracking targets described above. It is known that information necessary for performing a detection task is aggregated in an intermediate layer of a convolutional neural network. By using the intermediate features from the intermediate layer, it is possible to efficiently and accurately perform another task using detection targets (joint points), that is, a task such as the tracking process of detection points (joint points) in the present exemplary embodiment. In other words, as described above, since all the tracking targets are detected at a time in the detection process, the intermediate features have information on all the tracking targets. By using this information, the relation map estimation unit 803 described below can output the relations between all the tracking targets in the two frame images by a map estimation process involving a one-time convolutional neural network process.

The relation map estimation unit 803 integrates and inputs the intermediate features obtained in the course of detection in the first frame image and the second frame image to generate a map indicating the relation between the identical targets, and outputs the map. The map indicating the relation may be, for example, a map indicating a line segment of a trajectory connecting position coordinates of identical targets in the first frame image and the second frame image. There are no restrictions on the type and number of map(s) as far as the information indicating identical targets can be obtained from the map(s) with reference to the detected position information. In the present exemplary embodiment, the estimation of the relation map is also made by using a convolutional neural network. Taking a map with a line segment of a trajectory as an example, the convolutional neural network is learned in advance from correct-answer data such that pixels on the line segment between identical targets take on a likelihood value close to 1, and otherwise the pixels take on a likelihood value close to 0.

Accordingly, among the combinations of movement candidates of tracking targets detected from the first frame image and the second frame image, the combinations with high degrees of relation can be identified. Based on the information on the combinations, the matching unit 208 identifies the combination of identical targets to realize tracking of identical targets between frames.

Figure 10:
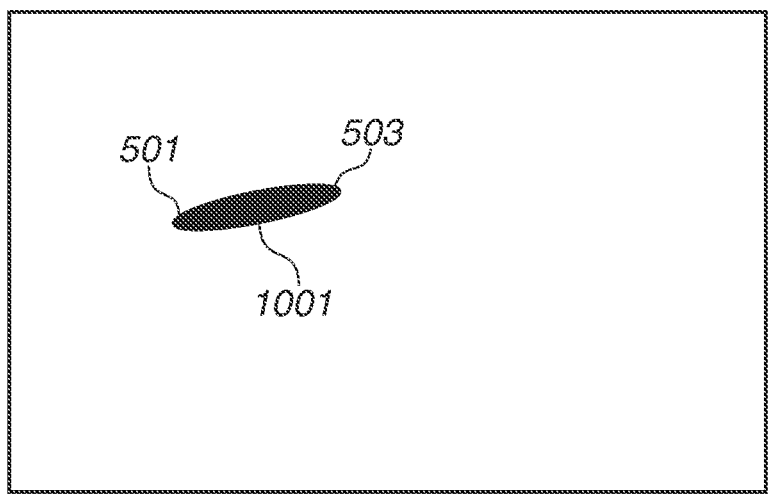
FIG. 10 is a diagram describing an example of a relation map.

For example, assuming that FIGS. 5A and 5B illustrate the first frame image and the second frame image, respectively, a map of a line segment indicating a trajectory of the neck position of the person tracked as illustrated in FIG. 10 is output. In other words, in the map, both ends of the line segment indicate detection positions (501, 503) of the neck in the first frame image and the second frame image, and the values of the line segment coordinates (pixel positions) (1001) between the combination of correct detection positions take on values close to 1. With respect to this map, the values of the line coordinates between the combination of detection positions are integrated and normalized by the distance (pixels). If the combination is a correct answer, the resultant value becomes close to 1. On the other hand, the line segment coordinates between a wrong combination of detection positions have no value, and thus the resultant value becomes lower than 1. This makes it possible to distinguish between the correct combination and the wrong combination. In this manner, it is possible to estimate the combination of identical targets with reference to the relation map at the detection positions. As described above, it is possible to estimate the relation between all the combinations of detection targets in two frame images by a one-time convolutional neural network process, whereby the combinations with high degrees of relation can be efficiently found.

Figure 9:
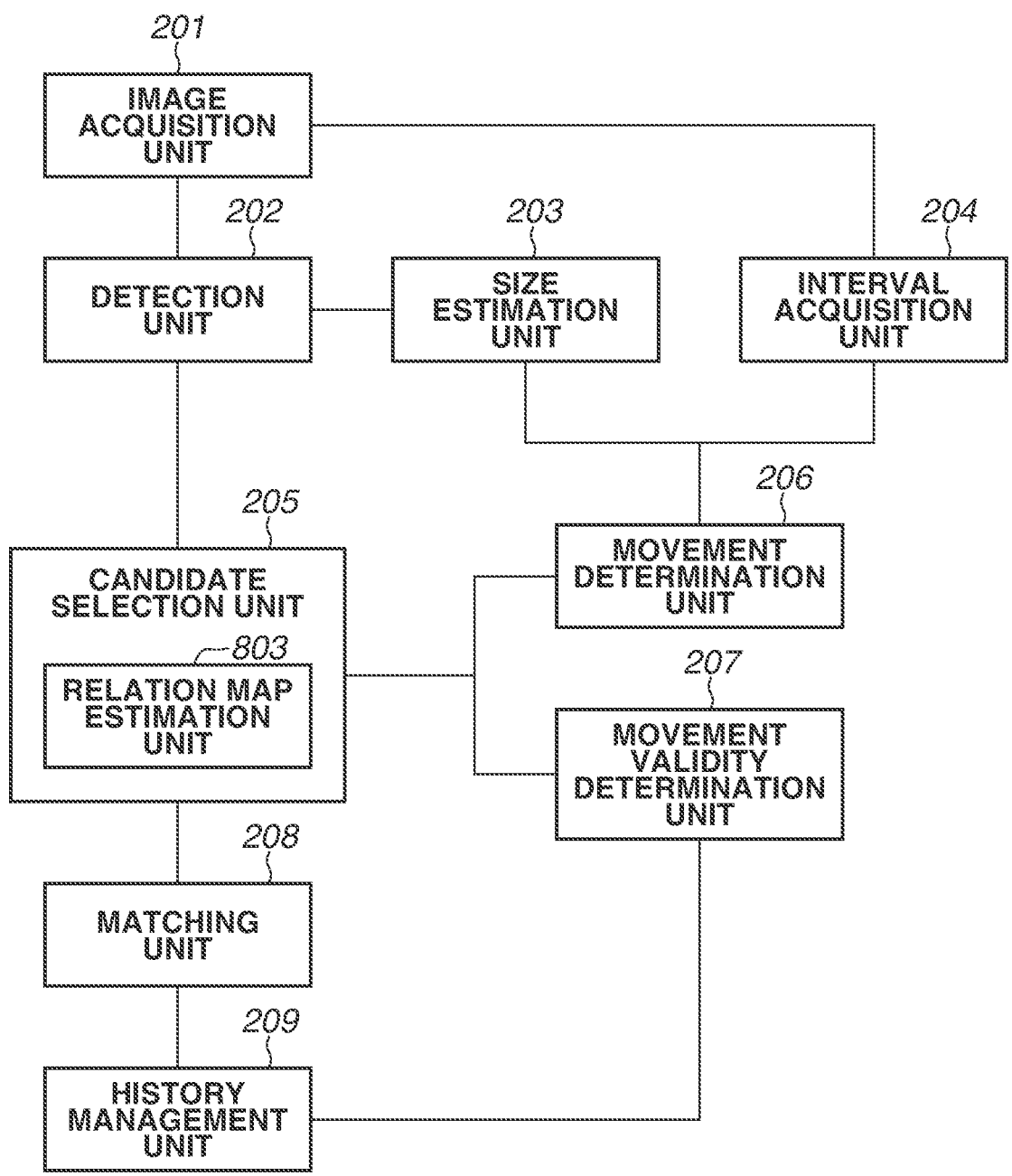
FIG. 9 is a diagram illustrating a functional configuration example of the image processing apparatus according to the second exemplary embodiment.

The relation map estimation unit 803 may be used to create combinations of tracking targets by the candidate selection unit 205 as in an example illustrated in FIG. 9. In the first exemplary embodiment, in step S401, all the combinations of movement candidates of the tracking targets are subjected to processing. In the second exemplary embodiment, the combinations are obtained based on the degrees of relation from the results of estimation by the relation map estimation unit 803, and the process illustrated in FIG. 4 may be performed on the combinations with high degrees of relation. Although, in the first exemplary embodiment, the matching unit 208 performs matching determination on each combination of tracking targets with reference to the score of similarity in feature amounts, the method for matching determination is not limited to this method if the relation map estimation unit 803 has a high degree of accuracy. For example, matching determination may be performed with reference to the map estimated by the relation map estimation unit 803. If no movement candidates can be uniquely determined, the selection may be made as post-processing by movement prediction as described above in relation to the first exemplary embodiment.

By estimating the relation map using the intermediate features detected based on the two frame images, the frame rate can be decreased to an extent that the estimation of the relation map is possible. For this reason, if the combinations can be efficiently and accurately estimated using a convolutional neural network as in the present exemplary embodiment, it is possible to achieve a high level of throughput while maintaining the tracking accuracy. For example, it is possible to realize further efficient tracking such as parallel tracking processes by a plurality of cameras.

In the exemplary embodiment described above, the size estimation unit 203 estimates a size of a subject as a tracking target based on the distance between two areas detected from the tracking target. However, the method for size estimation is not limited to this method. For example, if the information on the camera installation position and a viewing angle is acquirable, a size of a subject such as a person can be roughly estimated from the distance and the viewing angle, and thus the size of the subject as a tracking target may be estimated from the information on the camera installation position and the viewing angle. Alternatively, image capturing may be performed by a camera with two or more lenses to estimate the distance from a subject, and the size of the subject may be roughly estimated from the focal length of the camera and the distance to the subject.

In the exemplary embodiment described above, a subject as a tracking target is a person as an example. However, the subject may be an object not completely motionless like a person. In this case, the method for estimating the size of the subject by the size estimation unit 203 and the method for calculating the minimum moving amount threshold value by the movement determination unit 206 are adjusted in accordance with the subject. However, the methods may be decided heuristically or statistically as in the case where the subject is a person.

A plurality of types of subjects may be set as tracking targets such as a person, a vehicle, and an animal. In this case, the methods for size estimation and movement determination are adjusted to each type, the tracking targets are classified by a recognition process, and the different size estimation and movement determination processes are performed on the classified subjects. The classification of the subjects can be made by an existing class classification method. For example, as in the above-described detection process in the exemplary embodiment, the classification can be made by a known method such as learning a convolutional neural network. Accordingly, in the case of tracking a plurality of arbitrary types of subjects not limited to persons, the improvement in the accuracy of tracking the subjects in the non-moving state can be expected.

In order to enable the user to check whether the subject as a tracking target in the non-moving state can be correctly tracked, the combination matched by the matching unit 208 and the results of movement determination on the combination may be displayed in a superimposed state. For example, as illustrated in FIG. 7, the range of the minimum moving amount threshold value th calculated by the movement determination unit 206 may be displayed so as to be superimposed on the tracking results. This enables the user to, while watching the displayed image, check whether the range of the calculated minimum moving amount threshold value th is appropriate so that, even if the minimum moving amount threshold value th is too large or too small, the user can correct the above-mentioned coefficient α to improve the tracking accuracy.

The above-described exemplary embodiments are mere examples of concretization for carrying out the disclosure, and the technical scope of the disclosure should not be interpreted in a limited way due to these exemplary embodiments. In other words, the disclosure can be carried out in various forms without departing from the technical ideas or main features of the disclosure.

According to the disclosure, it is possible to accurately track a tracking target even in a video image captured at a low frame rate.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-103650, filed Jun. 16, 2020, which is hereby incorporated by reference herein in its entirety.

What is claimed is:
1. An apparatus comprising:
at least one processor; and
a memory coupled to the at least one processor, the memory having instructions that, when executed by the at least one processor, perform operations to:

acquire a video image captured by a camera, the video image including a first frame image having a first time stamp and a second frame image having a second time stamp;

detect a subject as a tracking target from each of the first frame image and the second frame image and identify a detection position of the detected subject;

determine whether the tracking targets are in a moving state or in a non-moving state in each combination of the tracking target detected from the first frame image and the tracking target detected from the second frame image based on the identified detection position;

determine the combination is valid based on a past moving amount and a past moving direction of the tracking targets in a frame image previous to the second frame image in a case where the combination of the tracking targets is determined to be a combination of tracking targets in the non-moving state; and perform matching determination to determine whether the combination is a combination of identical tracking targets in a case where the combination of the tracking targets is determined to be a combination of tracking targets in the non-moving state and in a case where the combination of the tracking targets is determined to be a valid combination of tracking targets in the moving state, and restrict the matching determination in a case where the combination of the tracking targets is determined not to be a valid combination of tracking targets in the moving state by the second determination.

2. The apparatus according to claim 1, wherein the at least one processor further performs operation to:

estimate a size of a subject as the detected tracking target, wherein a time interval between the first frame image and the second frame image is acquired, and a threshold value is calculated based on the estimated size of the subject and the acquired time interval between the frame images, and whether the tracking targets are in the moving state or in the non-moving state is determined based on the calculated threshold value.

3. The apparatus according to claim 2, wherein the tracking targets are in the non-moving state is determined in a case where a distance between the tracking target detected from the first frame image and the tracking target detected from the second frame image does not exceed the threshold value.

4. The apparatus according to claim 2, wherein two areas in the subject are detected as the tracking target, and wherein the size of the subject is estimated based on a distance between the detected two areas.

5. The apparatus according to claim 2, wherein an image of a region corresponding to the threshold value and a result of the matching determination being superimposed is generated and displayed.

6. The apparatus according to claim 1, wherein whether the tracking targets are in a moving state or in a non-moving state is determined in all the combinations of the tracking target detected from the first frame image and the tracking target selected from the second frame image.

7. The apparatus according to claim 1, wherein the at least one processor further performs operation to acquire an intermediate feature to be obtained based on the first frame image and the second frame image and generate a map that indicates a relation between the tracking targets detected from the first frame image and the second frame image, wherein the tracking targets with a high degree of relation is identified with reference to the map at positions of the tracking targets detected from the first frame image and the second frame image, and the matching determination is performed on the combination of the tracking targets with a high degree of relation.

8. The apparatus according to claim 1, wherein the combination of the tracking targets is determined to be a valid combination of tracking targets in the moving state in a case where the identified detection position in the second frame image is within a range of a movement position estimated based on the past moving amount and the past moving direction.

9. The apparatus according to claim 1, wherein the combination of the tracking targets is determined to be a valid combination of tracking targets in the moving state in a case where an inner product of a vector based on a moving amount and a moving direction of the combination and a vector based on the past moving amount and the past moving direction is not negative.

10. The apparatus according to claim 1, wherein the combination of the tracking targets is determined to be a valid combination of tracking targets in the moving state in a case where it is estimated that the tracking target detected from the second frame image is not moved in a direction opposite to the past moving direction.

11. A method comprising:

acquiring a video image captured by a camera, the video image including a first frame image having a first time stamp and a second frame image having a second time stamp;

detecting a subject as a tracking target from each of the first frame image and the second frame image and identifying a detection position of the detected subject;

determining whether the tracking targets are in a moving state or in a non-moving state in each combination of the tracking target detected from the first frame image and the tracking target detected from the second frame image based on the identified detection position;

determining the combination is valid based on a past moving amount and a past moving direction of the tracking targets in a frame image previous to the second frame image in a case where the combination of the tracking targets is determined to be a combination of tracking targets in the non-moving state; and performing matching determination to determine whether the combination is a combination of identical tracking targets in a case where the combination of the tracking targets is determined to be a combination of tracking targets in the non-moving state and in a case where the combination of the tracking targets is determined to be a valid combination of tracking targets in the moving state, and restricting the matching determination in a case where the combination of the tracking targets is determined not to be a valid combination of tracking targets in the moving state by the second determination.

12. The method according to claim 11, further comprising:

estimating a size of a subject as the detected tracking target; and acquiring a time interval between the first frame image and the second frame image, wherein the determining calculates a threshold value based on the estimated size of the subject and the acquired time interval between the frame images, and determines whether the tracking targets are in the moving state or in the non-moving state based on the calculated threshold value.

13. The method according to claim 11, further comprising acquiring an intermediate feature to be obtained based on the first frame image and the second frame image and generating a map that indicates a relation between the tracking targets detected from the first frame image and the second frame image,
  wherein the tracking targets with a high degree of relation is identified with reference to the map at positions of the tracking targets detected from the first frame image and the second frame image, and the matching determination is performed on the combination of the tracking targets with a high degree of relation.

14. A non-transitory computer-readable storage medium storing a computer-executable program for causing a computer to perform a method, the method comprising:
  acquiring a video image captured by a camera, the video image including a first frame image having a first time stamp and a second frame image having a second time stamp;
  detecting a subject as a tracking target from each of the first frame image and the second frame image and identifying a detection position of the detected subject;
  determining whether the tracking targets are in a moving state or in a non-moving state in each combination of the tracking target detected from the first frame image and the tracking target detected from the second frame image based on the identified detection position;
  determining the combination is valid based on a past moving amount and a past moving direction of the tracking targets in a frame image previous to the second frame image in a case where the combination of the tracking targets is determined to be a combination of tracking targets in the non-moving state; and
  performing matching determination to determine whether the combination is a combination of identical tracking targets in a case where the combination of the tracking targets is determined to be a combination of tracking targets in the non-moving state and in a case where the combination of the tracking targets is determined to be a valid combination of tracking targets in the moving state, and restricting the matching determination in a case where the combination of the tracking targets is determined not to be a valid combination of tracking targets in the moving state by the second determination.

15. The non-transitory computer-readable storage medium according to claim 14, further comprising:
  estimating a size of a subject as the detected tracking target; and
  acquiring a time interval between the first frame image and the second frame image,
  wherein the determining calculates a threshold value based on the estimated size of the subject and the acquired time interval between the frame images, and determines whether the tracking targets are in the moving state or in the non-moving state based on the calculated threshold value.

16. The non-transitory computer-readable storage medium according to claim 14, further comprising acquiring an intermediate feature to be obtained based on the first frame image and the second frame image and generating a map that indicates a relation between the tracking targets detected from the first frame image and the second frame image,
  wherein the tracking targets with a high degree of relation is identified with reference to the map at positions of the tracking targets detected from the first frame image and the second frame image, and the matching determination is performed on the combination of the tracking targets with a high degree of relation.

* * * * *